2,787,460

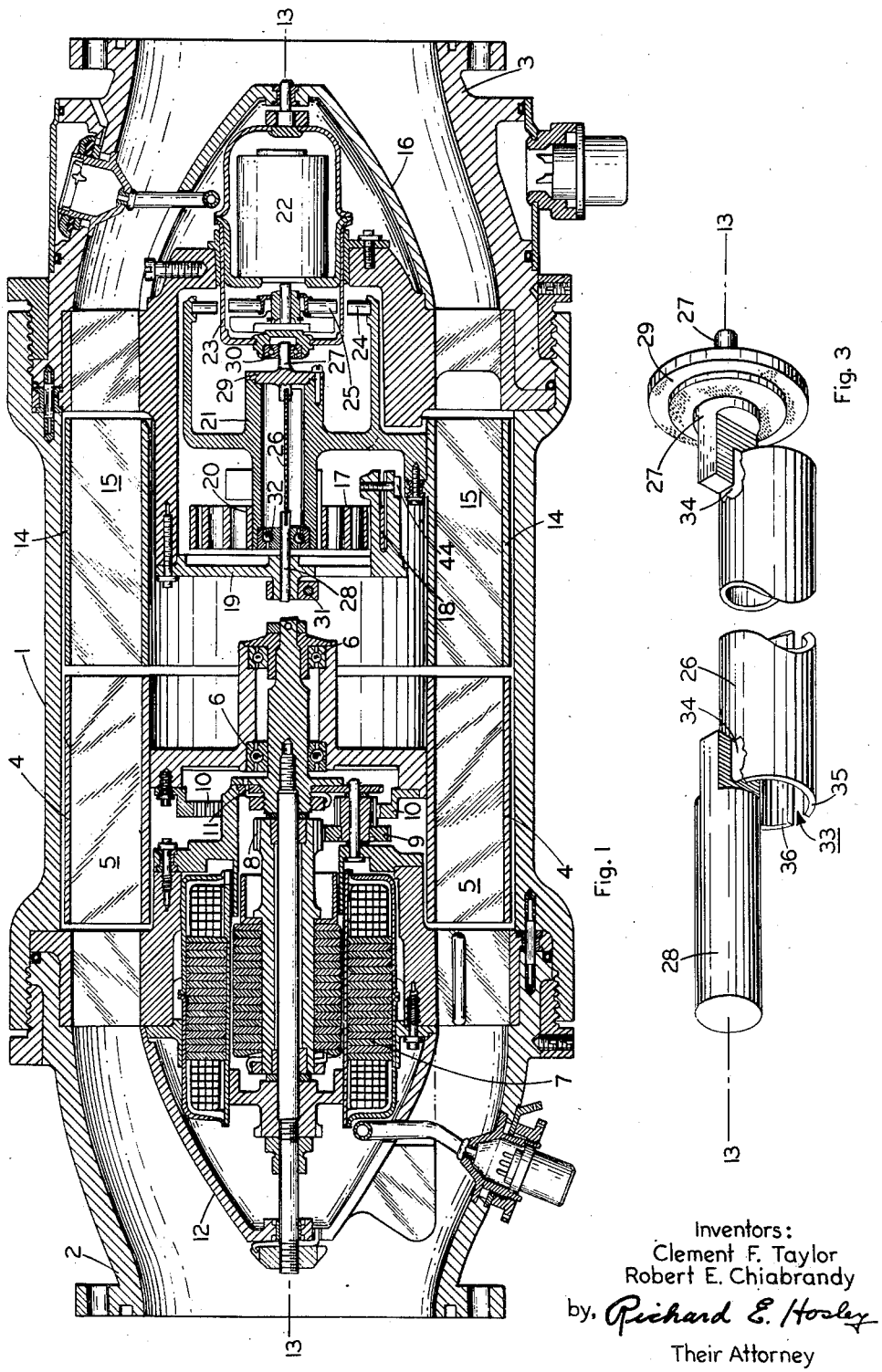
Inventors:
Clement F. Taylor
Robert E. Chiabrandy
by, Richard E. Hosley
Their Attorney April 2, 1957 R. E. CHIABRANDY ET AL 2,787,460
ANGULAR RESTRAINT AND SUPPORT ASSEMBLIES
Filed Oct. 4, 1955 2 Sheets-Sheet 2
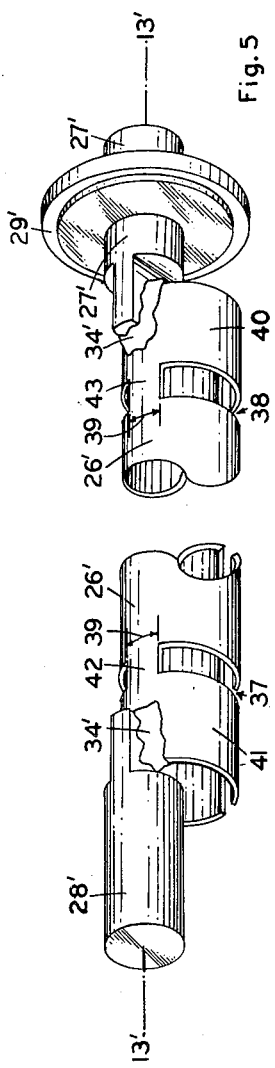
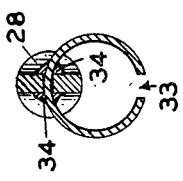
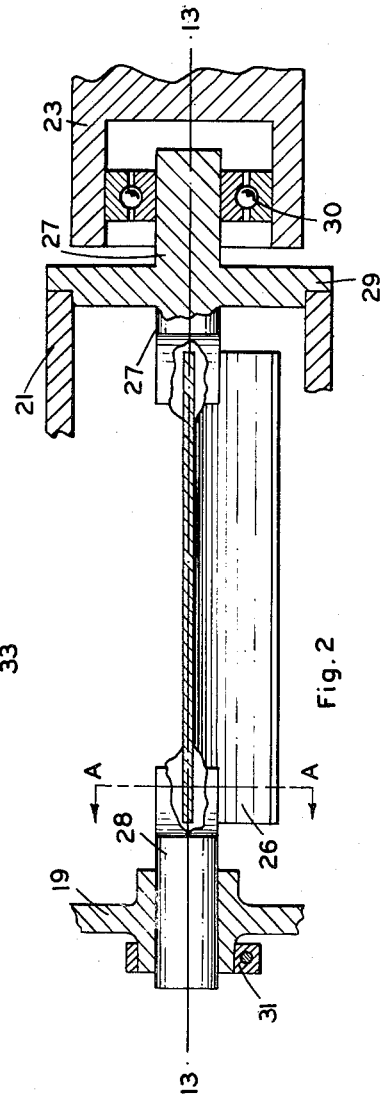
Inventors:
Clement F. Taylor
Robert E. Chiabrandy
by, Richard E. Hosley
Their Attorney United States Patent Office 2,787,460
Patented Apr. 2, 1957

ANGULAR RESTRAINT AND SUPPORT ASSEMBLIES

Robert E. Chiabrandy, Saugus, and Clement F. Taylor, Lynn, Mass., assignors to General Electric Company, a corporation of New York Application October 4, 1955, Serial No. 538,494

8 Claims. (Cl. 267—1)

The present invention relates to improvements in supports for instrument assemblies and, more particularly, to improved torsion tube support arrangements which provide angular restraint, obviate the need for thrust bearings, and withstand severe loadings imposed by shock and vibration.

Most commonly, accurately-controlled angular restraint of instrument mechanisms is provided through use of a support shaft suitably mounted in sensitive bearings and restrained by a separate spring such as the usual spiral. Unless the support shafts are of substantial size, they tend to break or to deform intolerably under severe conditions of vibration or radial or axial loading. Yet, with shafts of adequate size to resist such failures, space requirements are larger and the bearings are correspondingly larger and possessed of high levels of friction which may so alter the angular restraint characteristics as to disturb instrument accuracies. In those instances where axial loading is encountered, the necessary thrust bearings may introduce intolerable friction also.

One example of instrument support assemblies which tend to incur the foregoing difficulties is found in the restrained turbine assembly of axial-flow mass rate flowmeters. A fluid flowmeter of this nature may have a hollow cylindrical casing in which is positioned an upstream cylindrical impeller which has longitudinal peripheral slots and is rotated at substantially a constant speed such that the fluid flowing through it has a substantially uniform linear speed of motion imparted to it in an angular direction about the longitudinal axis of the impeller. A cylindrical turbine element is provided in proximate collinear downstream relationship to the impeller and is likewise constructed to have longitudinal peripheral slots to accommodate fluid flow. The turbine element is intended to deflect angularly about its longitudinal axis against the restraint of a spring, the angular deflections characterizing the mass of fluid flow per unit of time. One turbine support arrangement which suggests itself is the mounting of the turbine element upon a shaft having the usual bearings, including provisions for absorbing end thrust of the shaft. While such an arrangement operates satisfactorily with low and uniform flow rates and when only minor vibrations are experienced, the forces exerted by high flows, intermittent flows, shock, and severe vibration, destroy the flowmeter accuracies and ultimately damage the support arrangement.

Accordingly, it is one of the objects of the present invention to provide improved supports for angularly movable members which preserve substantially uniform friction characteristics and resist deformation under severe loading conditions.

In addition, it is an object to provide improved torsional restraint assemblies which utilize slotted tubular members in avoiding end thrusts and loading failures.

By way of a summary account of one aspect of this invention, a flowmeter turbine of the aforementiond type is mounted for angular movement about its longitudinal axis on a support arrangement including a longitudinally-slotted hollow cylindrical member. This support arrangement further comprises two axially aligned shafts each affixed to a different end of the cylindrical member such that their axes lie along the same longitudinal line taken through the cylindrical member diametrically opposite the longitudinal slot therein. One of the end shafts is fixedly mounted to the flowmeter casing, on a suitable bracket, the other being mounted in a bearing which affords freedom for angular movement. The turbine is angularly fixed with and supported by the movable end shaft. End thrust frictions are absent because axial alignment is realized through the fixed positioning of one of the end shafts rather than through use of end thrust bearings, and the slotted cylindrical member provides great resistance to failure under tension, compression and bending conditions.

Although the features of this invention which are believed to be novel are set forth in the appended claims, the details of the invention and the further objects and advantages thereof may be most readily comprehended through reference to the following description taken in connection with the accompanying drawings, wherein:

Figure 1 is a longitudinal cross-section of a mass rate flow detector embodying teachings of this invention; and Figure 2 details the features of the slotted torsion tube suspension employed in the apparatus of Figure 1;

Figure 3 provides a pictorial view of a torsion tube unit;

Figure 4 is a cross-sectional view of the support of Figure 2 taken along the section line A—A; and Figure 5 illustrates an alternative torsion tube unit which may be utilized in the practice of our invention.

With reference to Figure 1, there is shown a flow detector for the measurement of the mass of fluid flow per unit of time, including a cylindrical outer casing 1 through which fluid flows from an upstream inlet 2 to a downstream outlet 3. Flowmeters of this axial-flow type may include an upstream cylindrical impeller 4 which has longitudinal peripheral slots separated by partitions 5 and which is mounted on bearings 6 for rotation by a constant speed motor 7 through gears 8, 9, 10, and 11. Upstream bracket 12 provides the required support and serves as a housing for the motive members. Fluid flowing through the peripheral slots of impeller 4 has imparted to it a substantially uniform linear speed of motion in an angular direction about the longitudinal axis 13—13 of the impeller. A cylindrical turbine element 14 is likewise constructed to have longitudinal peripheral slots separated by partitions 15 and accommodating flow of all the fluid passing through the detector. Axis 13—13 is coincident with the axis of angular movement of turbine element 14 on its supports positioned by the downstream streamlined bracket 16. Angular restraint of turbine 14 is principally achieved through a resilient spiral spring 17 which has one end 18 fixed with the extension 19 of downstream bracket 16 and another end 20 fixed with the hollow turbine shaft 21. Angular deflection of turbine 14 is in proportion to the mass rate of fluid flow per unit of time through the detector.

Flowmeters of the foregoing construction may either actuate remote indicators or provide output signals for control initiation purposes, in known ways. An electrical signal generator 22 yields an appropriate output responsive to angular movements of the turbine 14 communicated thereto through the nonmagnetic sealed wall 23 by the turbine magnets 24 and follower magnets 25.

If desired, further details of flowmeter constructions similar to that here described may be observed in the disclosures of U. S. Patent No. 2,714,310 for "Mass Rate Flowmeter" assigned to the same assignee as that of the present application.

Turbine shaft 21 must be suspended collinearly with the axis of rotation of the impeller 4 for the aforesaid angular movements, and must be preserved in a fixed axial position. In addition, the levels of friction in the suspension must be low and uniform enough to preclude the errors which would result if, in addition to the restraint characteristics of spring 17, there were superimposed large and variable frictional restraints. For example, at low flow rates, the turbine 14 will deflect against the force of spring 17 only by small angular amounts, and if vibration occasions large frictional forces in the suspension, the turbine deflections would be erroneous to extents dependent upon these vibration conditions. Similarly, the thrust forces of fluid under measurement at high flow rates or when flow pulsations occur may cause high peaks of frictional restraint rendering the turbine deflections wholly inaccurate. Accordingly, the suspension for turbine 14 must be a sensitive one, the highest restraint friction values of which are low enough in relation to the values of restraint forces of spring 17 such that the turbine deflections can be erroneous only to minor and tolerable extents. However, low-friction bearings are generally small and delicate in construction and cooperate with similarly small and delicate pivots and support shafts. Such sensitive bearings are found to wear rapidly and lose their desirable friction characteristics under severe loading and vibration conditions, and are highly susceptible to failure. And, the cooperating delicate shafts and pivots are found to deform or break under like conditions.

In overcoming these difficulties, we provide a turbine suspension, shown in Figures 1 and 2, which includes a hollow cylinder 26 having a longitudinal slot running its full length. At each end of cylinder 26 there is affixed an end shaft or pivot member, both end shafts being coaxial with the detector axis 13—13. This axis 13—13 also runs longitudinally through the cylinder 26 at a position diametrically opposite the longitudinal slot therein. As is discussed more fully hereinafter, the end shafts 27 and 28 are each fixed with cylinder 26 in a position which allows the ends of the cylinder to shift axially under influence of twisting forces. End shaft 27 is provided with a shoulder 29 upon which one end of the hollow turbine shaft 21 rests, and is itself journalled in a radial bearing 30 mounted with the downstream bracket 16. The other end shaft 28 is clamped rigidly with the downstream bracket extension 19 by a fastener 31 and is thus prevented from moving either radially or axially. Bearing 32 cooperates with end shaft 28 and the hollow turbine shaft 21 to provide further support for the latter and to permit relative angular motion between these two shafts. No end thrust bearing surfaces are afforded, the requirement being obviated by the axial alignment preserved by the axial clamping of end shaft 28. With this support arrangement, the torsional restraint characteristics of the slotted cylinder 26 are effective between the turbine 14 and bracket 16 and are added to the angular restraint of spiral spring 17 to make up the net angular restraint characteristic. The torque gradient of such a cylinder may be and is preferably made low in relation to the torque gradient of the spiral spring, and is found to be linear over the range of 60 degrees of angular deflection within which turbine 14 is free to move. Slotted cylinder 26 may be constructed of brass, for example, although obviously other materials will lend themselves to use in suspensions. In addition to the advantageously low and linear values of torsional restraint which the suspension occasions as a result of the action of the thin slotted cylinder element, the resistance to loadings is most pronounced. This is true despite the small cross-sectional area of the hollow slotted cylindrical element. By way of illustration, tests performed with solid shafts have resulted in failure due to buckling under vibration conditions, while even more severe vibrations have not adversely affected the suspension utilizing a slotted hollow cylindrical element.

The detailed illustration of my suspension appearing in Figure 2 makes it clear that the longitudinal axis 13—13 passes longitudinally through the wall of the slotted cylinder 26, such that the cylinder is eccentrically disposed in relation to the support axis. This relationship is further clarified in the pictorial view of Figure 3, the longitudinally slotted portion 33 of cylinder 26 being diametrically opposite the cylinder wall through which the suspension axis 13—13 passes. Slotting in the longitudinal direction is necessary in achieving the angular or torsional flexibility of element 26, and the effect of low torsional restraint is not only to permit angular deflection of the supported member, such as the turbine 14, but to permit vibration and other loading forces to twist the element 26 without buckling or shearing its side walls. Radial and axial positions of the suspension remain substantially unaffected by such forces, however.

As is depicted in Figures 3 and 4, the junctions of end shafts 27 and 28 with slotted cylinder 26 extend for but small arcs about the cylinder ends. Their fastening may be accomplished by the illustrated brazing material 34 or by other means such as riveting. The small arcs over which fastening of the end shafts to the slotted cylinder is achieved permits the ends of the cylinder adjacent the slotted portion 33, such as ends 35 and 36, to move in axial directions when the cylinder is subjected to loading. Slotted portion 33 may be of any width sufficient to permit the cylinder ends to move axially, although the cylinder loses its ability to withstand severe loads and large angular deflections when the slot is made so large as to cause the cylinder to function more as a flat plate than as a cylinder. One slotted cylinder like that of Figures 2, 3, and 4 was made of brass, 2½ inches in length, with a ¼ inch outer diameter, 0.005 inch wall thickness, and a contact area with each end shaft having dimensions of 0.05 inch by 0.250 inch. The torque gradient was found to be linear and less than 4 gram-centimeters per degree of angular twisting.

In Figure 5 there is presented an alternative arrangement of suspension elements which enables accurate control of the suspension characteristics. One of the principal difficulties experienced in making the suspensions is that the end shafts for one slotted cylinder may not grasp the cylinder over the same area or in the same manner as the end shafts associated with another cylinder, and the torsional characteristics of the two units may differ. When the end shafts are brazed or welded to the slotted cylinder, this is particularly true, and further, the temperatures produced during such bonding may weaken the cylinder walls or at least alter their mechanical characteristics. The Figure 5 construction avoids these difficulties by virtue of the presence of the transverse slots 37 and 38 near the cylinder ends and removed from the end shafts. For convenience, elements of this unit are identified by the same reference characters as corresponding elements of the earlier-described units, except that prime accents are employed. Slots 37 and 38 are cut perpendicular to the longitudinal suspension axis 13'—13' to a depth leaving a fixed arcuate width 39 of cylinder wall disposed along the suspension axis. This cutting may be accomplished accurately and simply utilizing known techniques. Although end shafts 27' and 28' may be brazed to the cylinder ends 40 and 41 such that the brazing materials 34' extend over different and large arcs, the main body of slotted cylinder 26' is coupled with the end shafts through the accurately dimensioned wall portions 42 and 43. Thus, such support units may be readily made to exhibit like performances.

Referring to the flowmeter turbine suspension in Figure 1, it is noted that the spiral spring 17 provides about 85–90% of the angular restraint for turbine 14. By an adjustment of the spring tension afforded by the clamp 44, the net angular restraint of slotted cylinder 26 and spring 17 may be accurately regulated. Deflection of turbine 14 about axis 13—13 from a null or zero position is limited to about 60 degrees, a stopping action taking place when a part of turbine 14 strikes a part of bracket 16, for example. Tendencies toward failure in the case of the slotted cylinder suspension are found to be the greatest when the cylinder is angularly twisted by its maximum amount, which is about 60° in the case of the above-described flowmeter. At such times, vibration forces, particularly, tend to damage the suspension which has already been stressed nearly to its elastic limit. These tendencies may be avoided in a null or initial setting of the slotted cylinder in which the cylinder is pre-stressed in one angular direction by the spring 17. For example, the slotted cylinder 26 may be twisted 60 degrees in one angular direction by force of spring 17 when turbine 14 is in its undeflected position corresponding to the condiiton of zero flow through the detector. At such times, the flow forces are zero and the cylinder 26 is not subjected to the most severe loadings. As flow increases and turbine 14 deflects in the other angular direction, the slotted cylinder untwists until it is wholly untwisted at maximum flow when the turbine 14 has deflected 60 degrees. The loadings on the turbine suspension due to flow are apt to be most pronounced at such times, and the untwisted cylinder is best able to withstand the loading forces. In another advantageous arrangement, spring 17 initially biases the slotted cylinder 26 in one angular direction by an amount equal to one half the range of angular deflections to be experienced. For a deflection range of 60 degrees, the initial biasing or twisting of member 26 would be 30 degrees in one direction, and when turbine 14 had deflected through its full 60 degrees, the slotted member 26 would be twisted 30 degrees in the opposite direction. In such an arrangement, the slotted member is not twisted to near its elastic limit, and failures are even further minimized.

While the suspension here described has been discussed in its association with a flowmeter detector, it should be obvious that it may be utilized with other equipments as well. The specific embodiments of the invention herein disclosed are, of course, of a descriptive rather than a limiting nature, and various changes, combinations, substitutions, or modifications may be employed in accordance with these teachings without departing either in spirit or scope from this invention in its broader aspects.

What we claim as new and desire to secure by Letters Patent of the United States is:

1. A suspension for members relatively movable in angular directions about an axis comprising a hollow tube longitudinally slotted from end to end, means rigidly joining one end of said tube with one of said members at a position opposite the slotted portion of said tube such that said axis passes longitudinally through the wall of said tube opposite said slotted portion, and means mounting another of said members for angular positioning by the other end of said tube about said axis.

2. A suspension for members relatively movable in angular directions about an axis comprising a hollow tube longitudinally slotted from end to end, means rigidly joining one end of said tube with one of said members at a position opposite the slotted portion of said tube such that said axis passes longitudinally through the wall of said tube opposite said slotted portion, means pivotally supporting the other end of said tube on said one member for angular movement in relation thereto about said axis, and means mounting another of said members for angular positioning by said other end of said tube about said axis.

3. A suspension for members relatively movable in angular directions about an axis comprising a hollow open-ended cylinder longitudinally slotted from end to end, means fastening said cylinder to one of said members near one end thereof and at a position diametrically opposite the slotted portion thereof such that said axis passes longitudinally through the wall of said cylinder diametrically opposite said slotted portion and such that the longitudinal edges of said cylinder next to said slotted portion thereof may move relative to one another when said cylinder is twisted about said axis, and means mounting another of said members for angular positioning by the other end of said cylinder, said mounting means coupling said other member for angular movement with said other end of said cylinder along said axis and at a position diametrically opposite said slotted portion such that said longitudinal edges may move relative to one another.

4. A suspension for members relatively movable in angular directions about an axis comprising a hollow tube longitudinally slotted from end to end, means rigidly joining one end of said tube with one of said members at a position opposite the slotted portion thereof such that said axis passes longitudinally through the wall of said tube opposite said slotted portion and such that the longitudinal edges of said tube next to said slotted portion thereof may move relative to one another, pivot means supporting the other end of said tube on said one member for angular movement in relation thereto about said axis, said pivot means supporting said other tube end along said axis at a position opposite said slotted portion such that said tube edges may move relative to one another, and means mounting another of said members for angular positioning by said other tube end about said axis.

5. A suspension for members relatively movable in angular directions about an axis comprising a hollow substantially cylindrical element longitudinally slotted from end to end, means fastening one end of said hollow element to one of said members at a position diametrically opposite the slotted portion thereof such that said axis passes longitudinally through the wall of said substantially cylindrical element diametrically opposite said slotted portion and such that the longitudinal edges of said element next to said slotted portion thereof may move relative to one another when said element is twisted about said axis, low-friction means supporting the other end of said element on said one member for angular movement in relation thereto about said axis, said low-friction means supporting said other end of said slotted element along said axis at a position opposite said slotted portion such that said longitudinal edges of said element may move relative to one another, and means mounting another of said members for angular movement with said other end of said slotted element about said axis.

6. A suspension for members relatively movable in angular directions about an axis comprising a hollow open-ended cylinder having a wall thin in relation to the diameter thereof and longitudinally slotted from end to end, means fastening said cylinder to one of said members near one end thereof and at a position diametrically opposite the slotted portion thereof such that said axis passes longitudinally through said cylinder wall diametrically opposite said slotted portion, a pivot shaft fastened to said cylinder near the other end thereof and at a position diametrically opposite the slotted portion thereof such that said shaft is coaxial with said axis, bearing means on said one member cooperating with said pivot shaft to permit relative angular movement between said shaft and said one member about said axis, said fastening means and said pivot shaft being coupled with said cylinder such that the longitudinal edges of said cylinder next to said slotted portion may move relative to one another, and means mounting another of said members on said pivot shaft for angular positioning therewith about said axis.

7. A radial and axial suspension for a member angularly movable on a support about an axis comprising an open-ended hollow tube longitudinally slotted from end to end, means fastening one end of said tube with said support at a position opposite the slotted portion of said tube such that said axis passes longitudinally through the wall of said tube opposite said slotted portion and such that said tube is radially and axially fixed in position along said axis and in relation to said support, low-friction bearing means radially supporting the other end of said tube on said support for angular movement in relation thereto about said axis, said bearing means supporting said other tube end along said axis at a position opposite said slotted portion such that longitudinal edges of said tube next to said slotted portion may move relative to one another when said other tube end is twisted about said axis, means mounting said member for angular movement with said other tube end, and resilient means connected between said member and support and restraining angular movement of said member and other tube end in relation to said support, said tube being proportioned such that the torsional restraint thereof is low in relation to the restraint of said resilient means.

8. A radial and axial suspension for a member angularly movable on a support about an axis comprising an open-ended hollow tube longitudinally slotted from end to end, means fastening one end of said tube with said support at a position opposite the slotted portion of said tube such that said axis passes longitudinally through the wall of said tube opposite said slotted portion and such that said tube is radially and axially fixed in position along said axis and in relation to said support, low-friction bearing means radially supporting the other end of said tube on said support for angular movement in relation thereto about said axis in one angular direction from a first predetermined position, said bearing means supporting said other tube end along said axis at a position opposite said slotted portion such that longitudinal edges of said tube next to said slotted portion may move relative to one another when said other tube end is twisted about said axis from a second predetermined position, means mounting said member for angular movement with said other tube end, resilient means connected between said member and support and restraining angular movement of said member and other tube end in relation to said support and angularly biasing said tube from said second to said first predetermined position in the other angular direction about said axis, said tube and resilient means being proportioned such that the torsional restraint of said tube about said axis is low in relation to the angular restraint of said resilient means.

References Cited in the file of this patent
UNITED STATES PATENTS 2,734,742   Schwenk _____ Feb. 14, 1956

FOREIGN PATENTS 872,258   France _____ Feb. 5, 1942